(12) United States Patent
Asakura et al.

(10) Patent No.: US 9,113,081 B2
(45) Date of Patent: Aug. 18, 2015

(54) HAND-HELD ELECTRONIC DEVICE

(71) Applicant: Panasonic Corporation, Kadoma-shi, Osaka (JP)

(72) Inventors: Hirofumi Asakura, Osaka (JP); Hideki Harada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/103,201

(22) Filed: Dec. 11, 2013

(65) Prior Publication Data

US 2014/0098274 A1 Apr. 10, 2014

Related U.S. Application Data

(63) Continuation of application No. PCT/JP2012/004489, filed on Jul. 11, 2012.

(30) Foreign Application Priority Data

Jul. 14, 2011 (JP) .................................. 2011-155975

(51) Int. Cl.
| | |
|---|---|
| *H04N 5/232* | (2006.01) |
| *G03B 17/02* | (2006.01) |
| *H04N 5/225* | (2006.01) |
| *G03B 13/02* | (2006.01) |
| *G06F 1/16* | (2006.01) |
| *G06F 3/041* | (2006.01) |

(52) U.S. Cl.
CPC ............ *H04N 5/23293* (2013.01); *G03B 13/02* (2013.01); *G03B 17/02* (2013.01); *G06F 1/162* (2013.01); *G06F 1/1616* (2013.01); *G06F 1/1626* (2013.01); *G06F 1/1686* (2013.01); *G06F 3/041* (2013.01); *H04N 5/2252* (2013.01)

(58) Field of Classification Search
CPC . H04N 5/23293; H04N 5/2252; G03B 17/02; G03B 13/02; G06F 1/162; G06F 3/041
USPC ............................................. 348/333.12, 373
See application file for complete search history.

(56) References Cited

U.S. PATENT DOCUMENTS

| | | | |
|---|---|---|---|
| 2005/0221872 A1* | 10/2005 | Sakai .......................... | 455/575.1 |
| 2008/0031606 A1* | 2/2008 | Zax et al. ......................... | 396/56 |

(Continued)

FOREIGN PATENT DOCUMENTS

| | | |
|---|---|---|
| JP | H06-062397 | 3/1994 |
| JP | 2003-163824 | 6/2003 |

(Continued)

*Primary Examiner* — Gevell Selby
(74) *Attorney, Agent, or Firm* — Hamre, Schumann, Mueller & Larson, P.C.

(57) ABSTRACT

Included is a flat box shaped housing 1 having, on a main surface 1*a* thereof, a rectangular image display surface 2. Two images whose vertical directions are different from each other by 90 degrees are displayed on the image display surface 2. An imaging sensor 5 is disposed at a portion surrounding the image display surface 2, at a part away from center lines of the image display surface 2 in the height direction and the width direction. An optical axis of the imaging sensor 5 is tilted toward a reference point located on a perpendicular line that perpendicularly intersects the image display surface 2 at the center of the image display surface 2. With the above described configuration, an image captured from a fine angle is obtained.

5 Claims, 8 Drawing Sheets

(56) References Cited

U.S. PATENT DOCUMENTS

2008/0220821 A1     9/2008  Okuzako et al.
2009/0002391 A1*    1/2009  Williamson et al. .......... 345/619
2012/0106043 A1*    5/2012  Murakata et al. ........ 361/679.01
2012/0229411 A1*    9/2012  Arai .............................. 345/173
2013/0259462 A1*   10/2013  Yang et al. .................... 396/428

FOREIGN PATENT DOCUMENTS

| JP | 2004-304517 | 10/2004 |
| JP | 3691831 B | 9/2005 |
| JP | 2005-303391 | 10/2005 |
| JP | 2008-15800 | 1/2008 |

* cited by examiner

HAND-HELD ELECTRONIC DEVICE

BACKGROUND

1. Field

The present disclosure relates to an electronic device having an image capturing function.

2. Description of the Related Art

In order to be able to conduct so-called self-photographing using a portable information processing apparatus, which can be folded open or closed and whose main body is in a closed state, while viewing a captured image; it has been proposed to dispose, next to the camera, a second monitor capable of displaying an image that is being captured, on a surface of a housing having disposed thereon the camera that faces outside when the main body is in the closed state (cf. Japanese Patent No. 3691831).

SUMMARY

An object of the present disclosure is to obtain an electronic device capable of obtaining an image captured from a fine angle no matter which one of two images whose vertical directions are different from each other by 90 degrees is displayed on an image display surface.

In one general aspect, an electronic device of the present disclosure includes: a flat box shaped housing having, on a main surface thereof, a rectangular image display surface on which two images whose vertical directions are different from each other by 90 degrees are to be displayed; an imaging sensor disposed at a portion surrounding the image display surface; and a handle formed in a direction parallel to one side of the image display surface so as to protrude from the housing. An optical axis of the imaging sensor is tilted toward a reference point located on a perpendicular line that perpendicularly intersects the image display surface at the center of the image display surface. The imaging sensor is disposed at a portion connecting the housing and both ends of the handle.

Since the imaging sensor is disposed on a corner located on a line extending from a diagonal line of the image display surface, at a portion surrounding the image display surface, the electronic device of the present disclosure can position the imaging sensor above the image display surface no matter which one of two images whose vertical directions are different from each other by 90 degrees is displayed on the image display surface. Furthermore, since the imaging sensor includes a handle formed in a direction parallel to one side of the image display surface so as to protrude from the housing, and an imaging sensor disposed at a portion connecting the housing and both ends of the handle; an image captured from obliquely above a frontal view of a user can be displayed on the image display surface regardless of whether the image display surface is in a landscape-oriented state or a portrait-oriented state. As a result, an electronic device capable of capturing an image of the user from a natural angle can be obtained.

DETAILED DESCRIPTION

Figure 1:
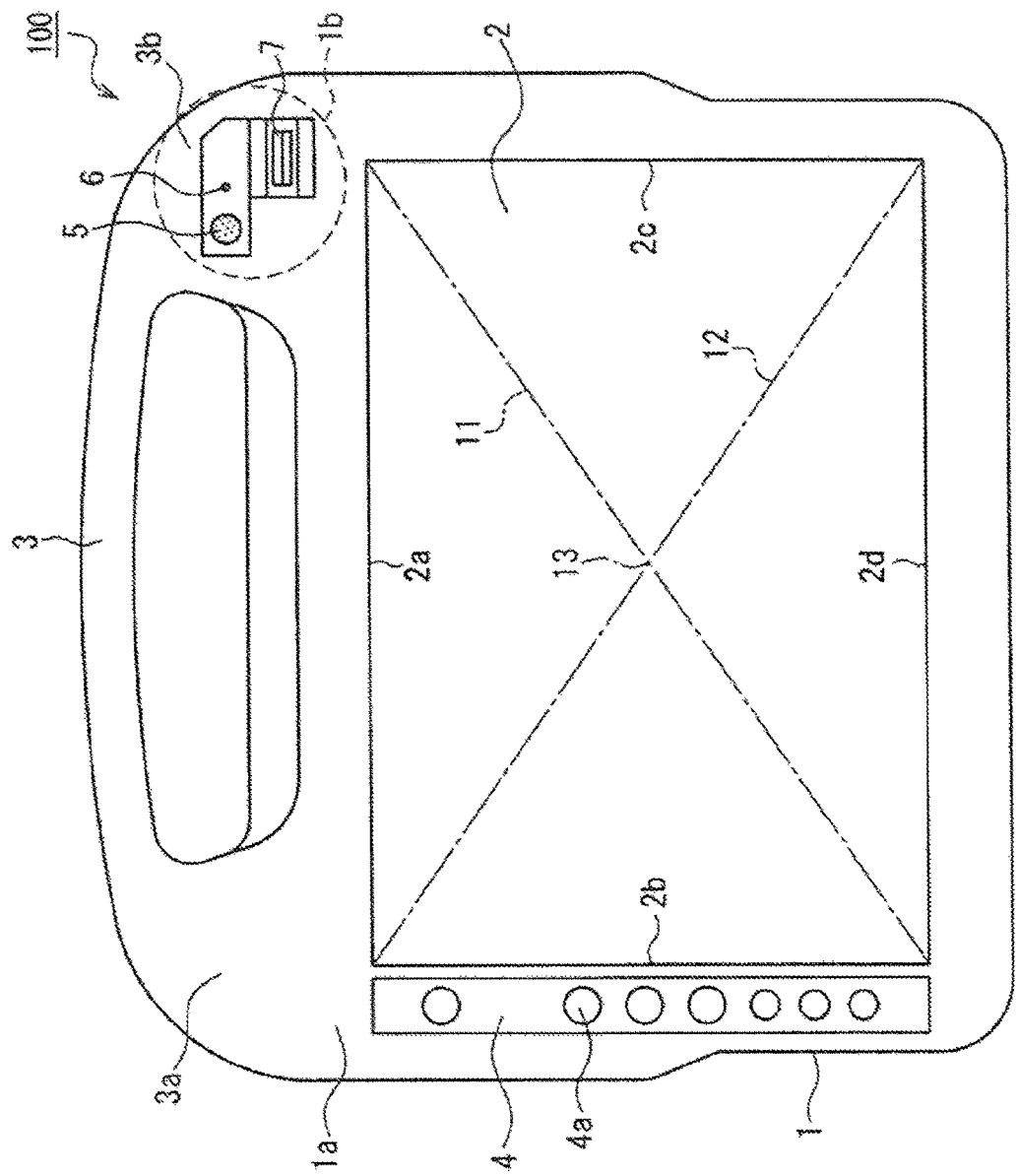
FIG. 1 is a plan view showing a configuration of a main surface of a tablet personal computer according to an embodiment.

An electronic device of the present disclosure includes: a flat box shaped housing having, on a main surface thereof, a rectangular image display surface on which two images whose vertical directions are different from each other by 90 degrees are to be displayed; and an imaging sensor disposed on a corner located on a line extending from a diagonal line of the image display surface, at a portion surrounding the image display surface.

In the electronic device of the present disclosure, since the imaging sensor is disposed on a corner located on a line extending from a diagonal line of the image display surface, at a portion surrounding the image display surface which is the main surface of the housing of the rectangular image display surface, the imaging sensor is disposed above the central part of the image display surface when, for example, an image is displayed on the image display surface oriented either in a portrait or landscape manner. Therefore, an image of the face of the user can be captured in a fine manner with an optic axis pointing from above.

In addition, it is possible to include a handle formed in a direction parallel to one side of the image display surface so as to protrude from the housing, and dispose the imaging sensor at a portion connecting the housing and both ends of the handle. By having such a configuration, the housing can be held using the handle. Furthermore, an image captured from obliquely above the frontal view of the user can be displayed on the image display surface regardless of whether the image display surface is in a landscape-oriented state or a portrait-oriented state.

In the electronic device with the above described configuration, it is possible to have an operation section disposed at a portion surrounding the image display surface and located along sides other than the two sides of the image display surface adjacent to the corner where the imaging sensor is disposed. By having such a configuration, the operation section disposed around the image display surface can be operated without blocking the displayed image.

Furthermore, since the optical axis of the imaging sensor can be tilted toward a reference point located on a perpendicular line that perpendicularly intersects the image display surface at the center of the image display surface. By having such a configuration, a natural image in which the user's own face is arranged at the center can be captured.

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Embodiments of the Invention

Hereinafter, an exemplary case in which the electronic device is a tablet personal computer will be described. The tablet personal computer described in the following with diagrammatic representation is, for example, a tablet personal computer envisioned to be used in a medical scene, and a mode with a handle for holding the electronic device is illustrated as an example.

FIG. 1 shows a tablet personal computer 100 as the electronic device according to the present embodiment.

The tablet personal computer 100 includes a flat box shaped housing 1, and, on a main surface 1 a thereof having the largest area, an image display surface 2 is formed by arranging a flat plate type image display device such as a liquid crystal panel. The image display surface 2 has a rectangular shape consisting of four sides that are a side 2a on the upper side, a side 2b on the left side, a side 2c on the right side, and a side 2d on the lower side in the figure. The image display surface of the tablet personal computer 100 has a landscape-oriented rectangular shape in which the side 2a and the side 2d are long. It should be noted that, other than the landscape-oriented rectangular shape shown in FIG. 1, the image display surface 2 may be a portrait-oriented rectangular shape or a square shape. Furthermore, a corner which is an intersection point of two sides in respective shapes does not necessarily have to be strictly a right angle. It is possible to have two sides connected with a small curve or with a diagonal line in a chamfer manner. In addition, each of the sides forming the rectangle may be curved very slightly outward or inward.

The image display surface 2 also has a function as a touch panel, and the tablet personal computer 100 can be operated by having the user touch the image display surface 2 with his/her finger, a stylus pen, or the like in accordance with a displayed image.

On the tablet personal computer 100, a handle 3 for holding the tablet personal computer 100 is formed in a stationary manner, in a direction (right-left direction in FIG. 1) parallel to the side 2a located on the upper side of FIG. 1 in the image display surface 2 shown as a landscape-oriented rectangular shape in FIG. 1. The handle 3 is formed so as to protrude from an outer shell of the housing 1, and both ends 3a and 3b of the handle 3 are connected to the housing 1.

An operation section 4 for operating the tablet personal computer 100 is disposed in a so-called frame area outside the image display surface 2 along the side 2b located on the left side in FIG. 1 of the image display surface 2. Multiple operation buttons 4a are disposed on the operation section 4. The operation buttons 4a include a power button for turning on/off power, a mode selection button for selecting a mode of the image displayed on the image display surface, a shutter button for a later described camera 5 which is an imaging sensor, and the like. The operation buttons 4a are used to control the tablet personal computer 100 in addition to images displayed on the image display surface 2.

At a corner 1b located on a line extending from either one of two diagonal lines 11 and 12 (the diagonal line 11 in FIG. 1) on the image display surface 2, and on a peripheral portion, i.e., the frame portion, of the image display surface 2; the camera 5 which is the imaging sensor, a microphone 6 for acquiring audio, and a fingerprint authentication section 7 for protecting security of the tablet personal computer 100 are disposed. Among the portions connecting the housing 1 and the both ends 3a, 3b of the handle 3, the corner 1b corresponds to the connection part (3b among the both ends 3a, 3b) on the right side in FIG. 1. Furthermore, the arrangement position of the operation section 4 is a position along the side 2b which is not any one of the two sides (in FIG. 1, the side 2a on the upper side and the side 2c on the right side of the image display surface 2) of the image display surface 2 forming the corner 1b where the camera 5 is disposed. When the arrangement position of the operation section 4 is configured in such manner, the user can, for example, operate the shutter of the camera 5 using the operation buttons 4a arranged on the operation section 4 without blocking an image capturing angle of the camera 5.

The camera 5 is an imaging sensor for capturing an image of a facial expression of the user operating the tablet personal computer 100, or for capturing an image of an object to which the main surface 1a of the tablet personal computer 100 is directed. As the camera 5, various electric elements capable of converting optical signals into electric image data such as CCD sensors and C-MOS sensors may be used. It should be noted that images to be captured by the camera 5 include either or both a still picture and a motion picture. Furthermore, as the microphone 6 and the fingerprint authentication section 7 disposed in the vicinity of the camera 5, sensors conventionally used for tablet personal computers and notebook personal computers may be applied without any modifications.

Various electronic devices and apparatuses that are usually mounted in a personal computer are included inside the tablet personal computer 100, such as a central processing unit (CPU) for various processes and control, a hard disk drive (HDD) which is the main memory device, a rechargeable battery which is an operational power supply, a wired/wireless LAN board, and a video board for displaying images. In addition, on the lateral surface portions of the tablet personal computer 100 and the reverse surface which is the surface on the opposite side of the main surface 1a from the image display surface 2; connection terminal for communicating various signal between outside and the tablet personal computer 100, and a connection port for mounting a memory card, a PC card, etc., are formed. However, since these configurations are identical to those in conventionally tablet personal computers and notebook personal computers, detailed description thereof is omitted.

Figure 2:
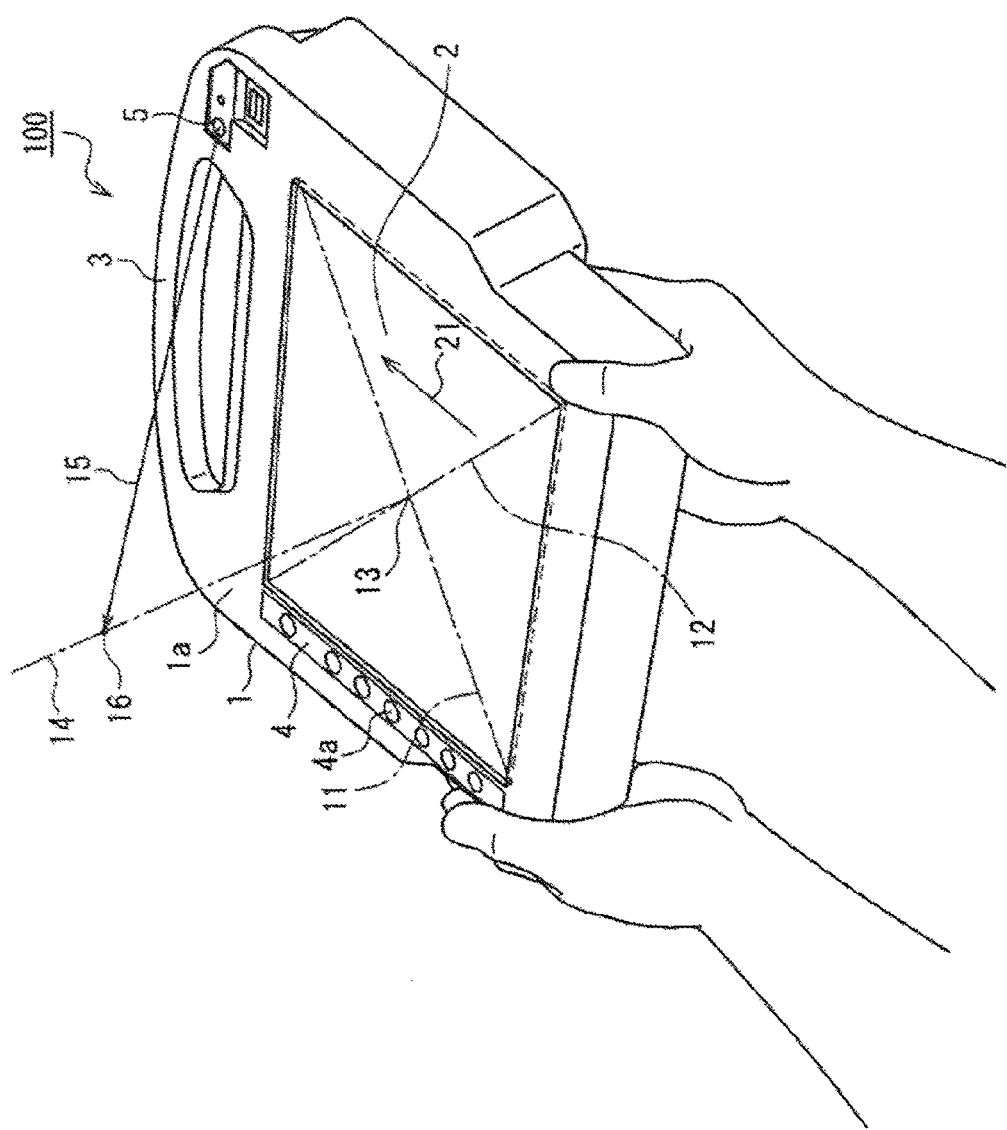
FIG. 2 shows a first usage status of the tablet personal computer according to the present embodiment.

FIG. 2 is for describing a first usage status of the tablet personal computer 100.

As shown in FIG. 2, when operating the tablet personal computer 100, the user holds, using both hands, both ends of the housing 1 on a side opposite to the side from which the handle 3 protrudes while arranging the handle 3 away from the user's body. In this case, an image displayed on the image display surface 2 is an image whose upward direction is a direction shown as an arrow 21 in FIG. 2, and is a landscape image that is long in the right-left direction and short in the vertical direction in conformity with the image display surface 2 that is in a landscape-oriented rectangle state.

At this state, since the operation section 4 of the tablet personal computer 100 is situated on the left side of the image display surface 2, the user can operate the operation buttons 4a on the operation section 4 by pressing the operation buttons 4a with a finger on the left hand while holding the tablet personal computer 100.

In the usage state of the tablet personal computer 100 shown in FIG. 2, the camera 5 is located on the upper right side when viewed from the user relative to the position of a center 13 of the image display surface 2. As a result, an image captured by the camera 5 becomes an image capturing the frontal view of the user from obliquely above.

In addition, in the tablet personal computer 100, an optical axis 15 of the camera 5 is not pointing a direction perpendicular to the main surface 1a (i.e., the image displaying screen of the image display surface 2) of the housing 1 on which the camera 5 is disposed, but is tilted toward a reference point 16 located on a perpendicular line 14 perpendicularly intersecting the image display surface 2 and passing through the center 13 of the image display surface 2 (i.e., an intersection point of the two diagonal lines 11 and 12 of the image display surface).

In the state shown in FIG. 2, the user holding the tablet personal computer 100 will try to view an image displayed on the image display surface 2 directly from the front. Therefore, the user's face is positioned in front of the image display surface 2 and the center of the user's line of sight becomes approximately identical to the perpendicular line 14 from the center 13 of the image display surface 2. On the other hand, if the optical axis of the camera 5 is perpendicular with respect to the main surface 1a of the housing 1, the line of sight of the user and the optical axis of the camera 5 become parallel lines separated by the distance between the center 13 of the image display surface 2 and the arrangement position of the camera 5, resulting in the user's face not positioned at the center of the image capturing range of the camera 5. In addition, since the line of sight of the user does not match the optical axis of the camera 5, the captured image of the user will give an impression of being unnatural.

However, in the tablet personal computer 100, since the optical axis 15 of the camera 5 is tilted toward the reference point 16 located on the perpendicular line 14 from the center 13 of the image display surface 2, the user's face can be positioned at the center of the image capturing range of the camera 5. Although the line of sight of the user and the optical axis of the camera 5 do not fully match, an image that is not perceived as very odd can be captured. It should be noted that the reference point 16 can be set at a distance where the user can clearly view the image display surface 2.

Figure 3:
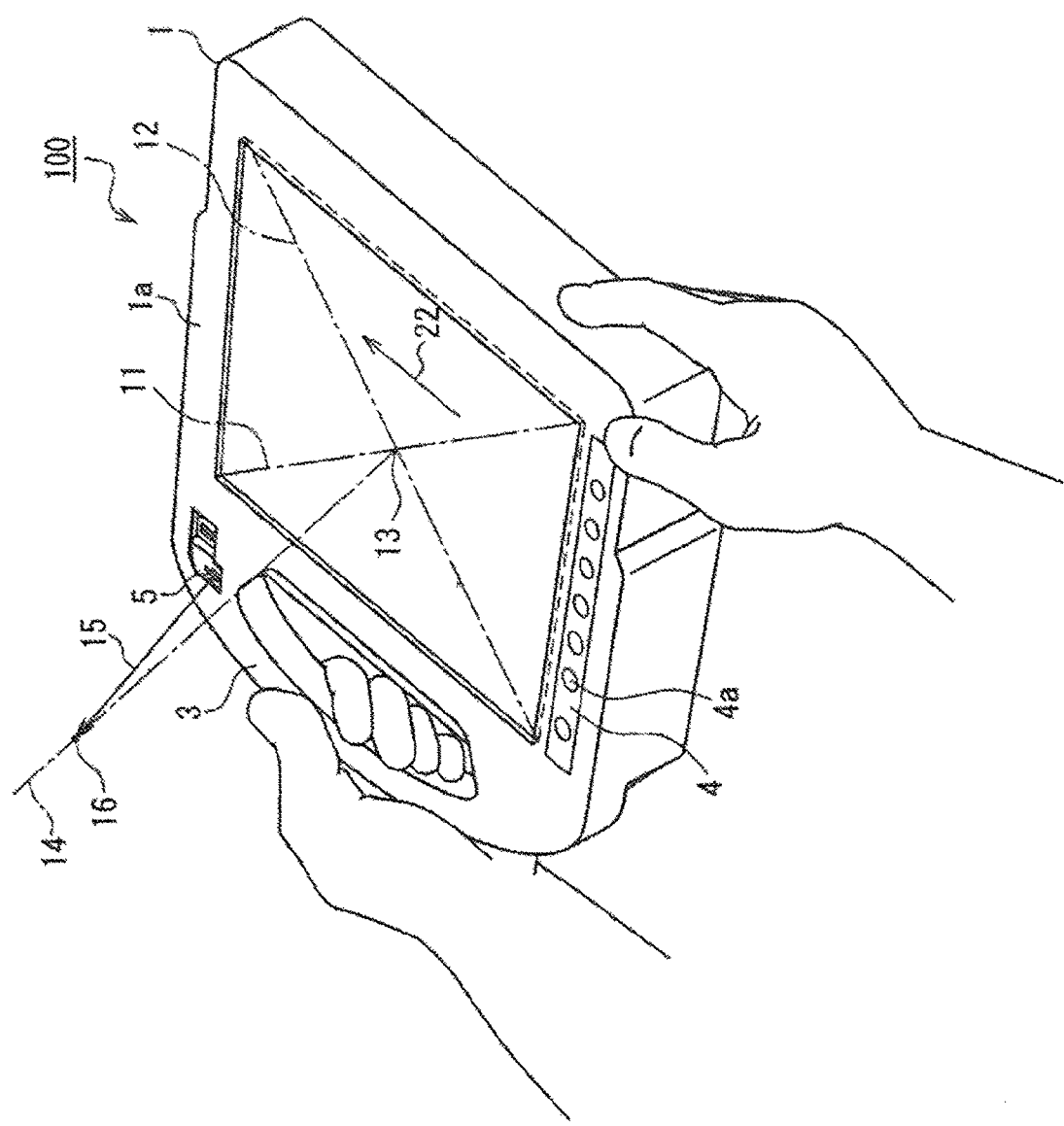
FIG. 3 shows a second usage status of the tablet personal computer according to the present embodiment.

FIG. 3 is for describing a second usage status of the tablet personal computer 100. The second usage status shown in FIG. 3 is a state in which the user is utilizing the handle 3 of the tablet personal computer 100 of the present embodiment to hold and use the tablet personal computer 100.

As described above, the handle 3 of the tablet personal computer 100 can be used not only as a handle when carrying the tablet personal computer 100, but also for holding the tablet personal computer 100 when an image whose vertical direction is a direction shown with an arrow 22 in the figure is displayed on the image display surface 2. It is needless to say that the displayed image in the usage state shown in FIG. 3 is a portrait image that is short in the right-left direction and long in the vertical direction in conformity with the image display surface 2 that is in a portrait-oriented state.

Also in the usage state shown in FIG. 3, the camera 5 is located on the upper left side when viewed from the user relative to the position of the center 13 of the image display surface 2. As a result, an image captured by the camera 5 becomes an image capturing the frontal view of the user from obliquely above.

Furthermore, as shown in FIG. 3, when the tablet personal computer 100 is used while having the image display surface 2 arranged in a portrait orientation, the optical axis 15 of the camera 5 is not pointing a direction perpendicular to the main surface 1a (i.e., the image displaying screen of the image display surface 2) of the housing 1, but is tilted toward the reference point 16 located on the perpendicular line 14 from the center 13 of the image display surface 2. As a result, the user's face is positioned at the center of the image capturing range of the camera, and an image that is not perceived as very odd due to the line of sight of the user can be captured.

Furthermore, as shown in FIG. 3, when the image display surface 2 is used in a portrait-oriented state, the operation section 4 having the operation buttons 4a arranged thereon is located on the lower side of the image display surface 2. Therefore, the user can hold the bottom surface side of the tablet personal computer 100 with his/her right hand, and operate the operation buttons 4a using a finger of the right hand. In addition, in the state shown in FIG. 3, an arm of the user trying to operate the operation buttons 4a will not cover and conceal a displayed image or the visual field of the camera 5 to cause any inconveniences.

Furthermore, with the tablet personal computer 100, since the both ends 3a and 3b of the handle 3 are fixed on the housing 1, even when the user holds the handle 3 with his/her left hand, and removes his/her right hand from the housing 1 to touch and operate the image display surface 2 as shown in FIG. 3, the tablet personal computer 100 can be stably held without being shaken.

Therefore, with the tablet personal computer 100, when the operation section 4 is disposed along a side other than the two sides forming the corner where the camera 5 is disposed, high operability of the tablet personal computer 100 can be ensured.

As described above, with the tablet personal computer 100, no matter whether the image display surface 2 is used as being arranged in portrait orientation or landscape orientation, the position of the camera 5 is located above the user with respect to the center 13 of the image display surface 2 where the user's face is located. Therefore, instead of an unnatural image viewing the user's face from below, a natural image capturing the user's face from obliquely above can be obtained.

It should be noted that the position of the reference point 16 on the perpendicular line 14 from the center 13 of the image display surface 2, i.e., the height of the reference point 16 from the center 13 of the image display surface 2, can be changed as appropriate by taking into consideration the sizes of the image display surface 2 and the housing 1, and the type and resolution of the image displayed on the image display surface 2. More specifically, when the image display surface 2 is small or when the displayed image is detailed, since there is a strong tendency that the user will bring his/her face close to the image to view the image, the height of the reference point 16 from the center 13 of the image display surface 2 is changed so as to be small. One specific example of a numerical value is a height of 30 cm for the reference point 16 from the center 13 of the image display surface. It should be noted that, as means for changing the reference point 16, it is possible to include, for example, a position adjustment part for changing the tilt angle of the optical axis 15 of the camera 5 in accordance with the position of the reference point 16 on the perpendicular line 14 from the center 13 of the image display surface 2. Furthermore, it is also possible to include a depth-of-field adjusting section for adjusting, using an aperture, the depth of field of the optical image entering the imaging sensor.

It should be noted that in both the first usage state shown in FIG. 2 and the second usage state shown in FIG. 3, a state is shown in which the user is holding the tablet personal computer 100 using both hands. However, since the tablet personal computer 100 has a touch-panel function, the user is envisioned to hold the tablet personal computer 100 only with the left hand and operate the touch panel with the right hand. Furthermore, it is also conceivable that the user operates the tablet personal computer 100 while having it placed on a desk or the like. With the tablet personal computer 100, in both of these usage states, since the relationship between the position of the user's face and the arrangement position of the camera is set identical to that of the state shown in FIG. 2 and FIG. 3 where the position of the camera 5 is ensured to be above the center of the image display surface 2, the user's face can be located at the center of the image capturing range of the camera 5, and an image in which the angles of the user's captured face and eye line are natural can be obtained.

As shown in FIG. 1, in the tablet personal computer 100, the corner 1b where the camera 5 is disposed is a position above a position on a line extending from the diagonal line 11 of the image display surface 2 at the peripheral portion of the image display surface 2 in FIG. 1. Therefore, the corner 1b where the camera 5 is disposed indicates an area within a certain range around the corner portion formed by two sides of the image display surface 2, and the camera 5 does not have to necessarily be disposed precisely on a line extending from the diagonal line 11. The present disclosure is applicable when the camera 5 is arranged in a tilted manner. Furthermore, as in the present embodiment, when the camera 5 is disposed at a portion surrounding the image display surface 2 at a position away from the center of the image display surface 2 in the vertical direction and the horizontal direction; the advantageous effect becomes larger since it is necessary to correct the optical axis of the camera 5 when the image display surface 2 is in the portrait orientation or the landscape orientation. Furthermore, when the camera 5 is disposed at a portion surrounding the image display surface 2 as in the present embodiment at a part away from the four corners of the image display surface 2 in a diagonal direction, the advantageous effect of correcting the optical axis of the camera 5 becomes even larger. The image display surface 2 of the tablet personal computer 100 has a width of approximately 21.4 cm and a height of approximately 16.2 cm, and the arrangement position of the camera 5 may be at position tilted from the center 13 of the image display surface 2 relative to the diagonal line 11 by, for example, approximately 20 degrees toward the long side 2a or approximately 10 degrees toward the short side 2c. It should be noted that the reason why the margin for the arrangement position on the long-side side is larger than the margin for the short-side side is because, when the image display surface 2 is used in the portrait orientation, the distance between the camera 5 and the center 13 of the image display surface 2 becomes naturally large, and it is possible to capture an image of the user's face from obliquely above. Thus, on the tablet personal computer 100 shown in FIG. 1, the camera 5 is disposed at the connecting portion (3b among the both ends 3a, 3b) of the housing 1 and the handle 3, where there is a large margin in terms of space.

Figure 4:
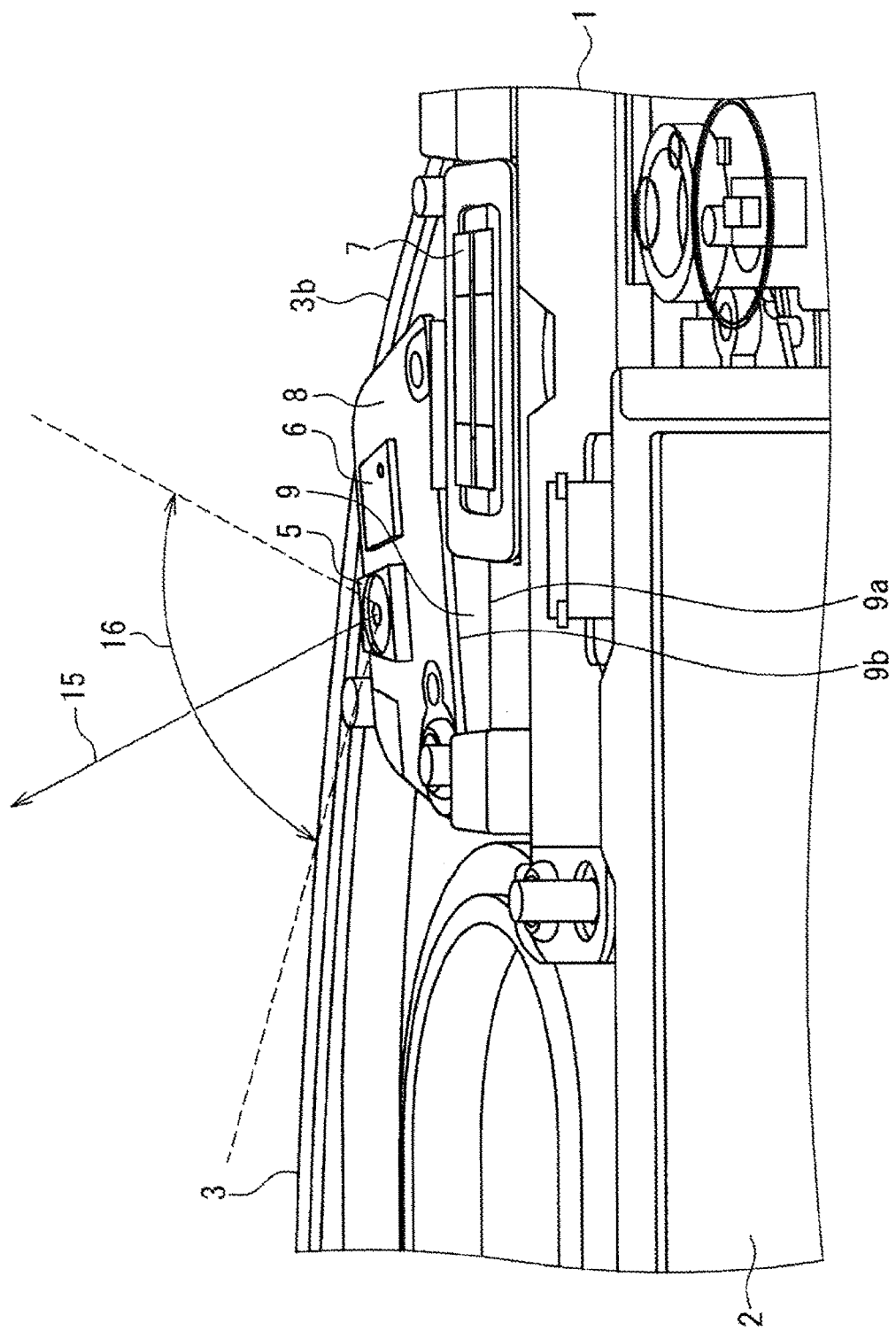
FIG. 4 is a principal part enlarged perspective view showing a configuration of a part where an imaging sensor is disposed on the tablet personal computer according to the present embodiment.

FIG. 4 is a principal part enlarged perspective view of the tablet personal computer 100 showing a configuration of a portion where the camera 5 which is an imaging sensor is disposed. It should be noted that, in order to show a fixed portion of a camera module substrate 8 where the camera 5 and the microphone 6 are mounted, FIG. 4 shows a state in which an upper surface cover of the housing 1 is removed.

As shown in FIG. 4, in the tablet personal computer 100, the camera module substrate 8 on which the camera 5 is mounted is fixed on the inner surface of the housing 1 by a supporting metallic part 9. Thus, the camera module substrate 8 is disposed on the connecting portion (3b among the both ends 3a, 3b) of the handle 3 and the housing 1 on the right-side end of FIG. 4. Furthermore, the camera module substrate 8 is fixed to the inner surface of the housing 1 by the supporting metallic part 9 whose bottom surface 9a is parallel to the main surface 1a of the housing 1 and whose mounting surface 9b arranged on the upper surface of the bottom surface 9a for the camera module substrate 8 is tilted.

As shown in FIG. 4, in the supporting metallic part 9, although the bottom surface 9a is parallel to the main surface 1a of the housing 1 in a manner similar to the image display surface 2 and the fingerprint authentication section 7, the mounting surface 9b is tilted such that the right side in the figure in the right-left direction of FIG. 4 is higher with respect to the bottom surface 9a. Furthermore, in the depth direction of paper surface of FIG. 4, the tilting is set such that the depth direction side is higher than the near side.

As a result, since the whole camera module substrate 8 mounted on the mounting surface 9b of the supporting metallic part 9 is tilted in the direction where the image display surface 2 is disposed, the optical axis 15 of the camera 5 becomes tilted to the near left side in FIG. 4, and it becomes possible to obtain a state in which an image capturing range 16 of the camera 5 is tilted toward the near left side in FIG. 4.

It should be noted that, with regard to the tablet personal computer 100, although an example has been shown in which the mounting surface 9b of the supporting metallic part 9 where the camera module substrate 8 is disposed is tilted, the method for tilting the optical axis of the camera 5 in a predetermined direction is not limited to this method. Examples of such method include: tilting only the camera 5 with respect to the camera module substrate 8 and fixing the camera 5 thereto; using, as the camera 5, an imaging sensor whose optical axis is tilted; and the like.

As describe above, on the tablet personal computer 100, since the camera which is an imaging sensor is disposed on a corner located on a line extending from a diagonal line of the image display surface, at a portion surrounding image display surface; the camera is located above the center of the image display surface with respect to user regardless of whether the image display surface is used in a landscape-oriented manner or a portrait-oriented manner. As a result, the image captured by the camera can be obtained as a natural image captured from diagonally above the user's face.

In addition, in the tablet personal computer 100, since the optical axis of the camera is tilted toward a reference point located on a perpendicular line that perpendicularly intersects the image display surface at the center of the image display surface; the user's face will be located at the center of the image captured by the camera, and a more natural image can be captured.

Figure 5:
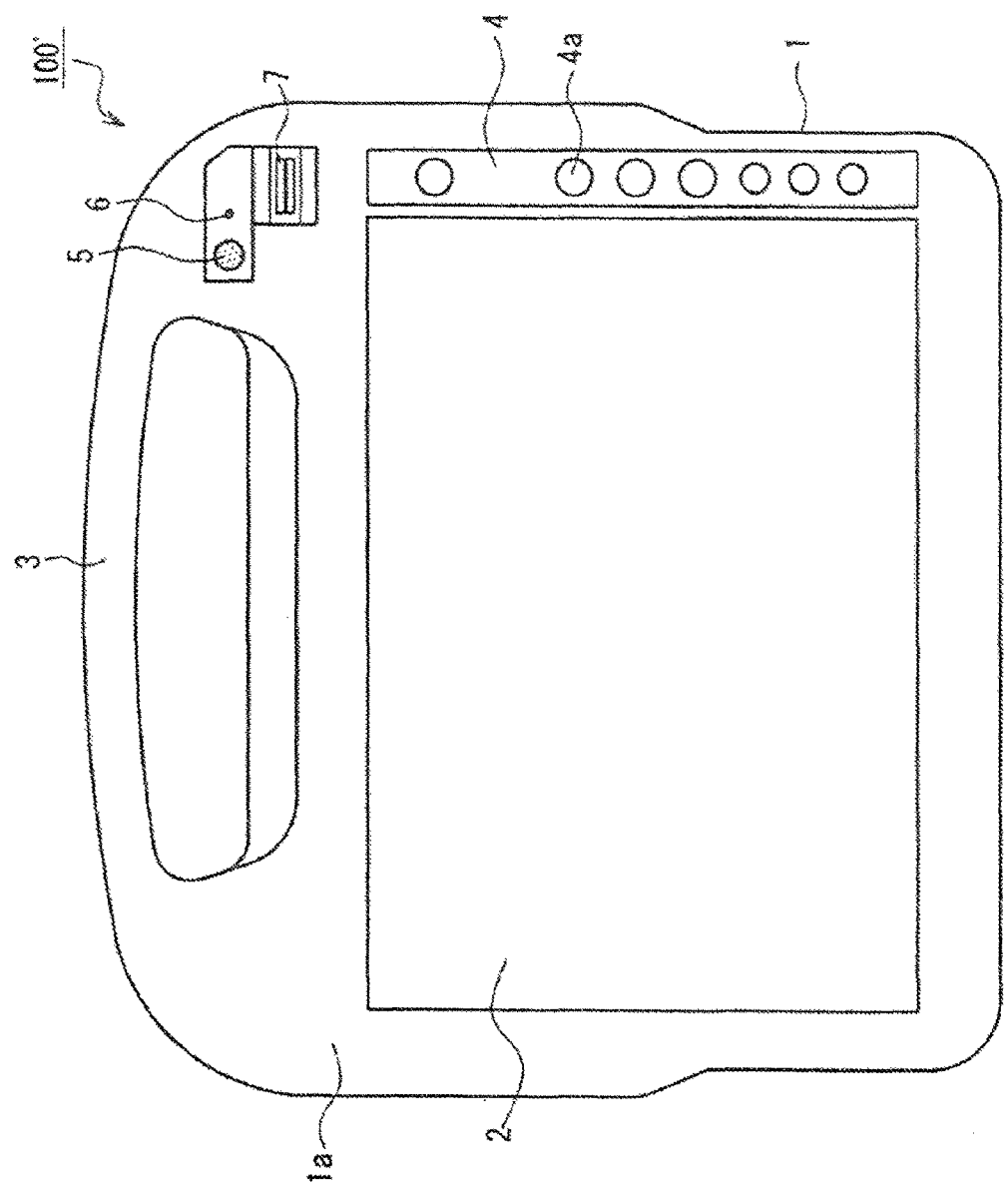
FIG. 5 is a plan view showing a modification of the tablet personal computer according to the present embodiment.

It should be noted that, when the tablet personal computer 100 shown in FIG. 1 is held such that the handle 3 is disposed away from the user's body as shown in FIG. 2, the operation section 4 of the image display surface 2 is located on the left side. However, with the tablet personal computer 100, the operation section 4 may be disposed on the, for example, right side of the image display surface 2 as a tablet personal computer 100' as shown in FIG. 5. When the operation section 4 is disposed on the right side of the image display surface 2 as in the case with the tablet personal computer 100' shown in FIG. 5, if the image display surface 2 is arranged in a landscape-oriented manner to be used as shown in FIG. 2, the user can operate the operation buttons 4a with a finger of the right hand holding the housing 1 from below. In addition, with the tablet personal computer 100', if the user is to use the image display surface 2 arranged in a portrait-oriented manner as shown in FIG. 3, by enabling the shutter operation of the camera 5 not on the operation buttons 4a but on the touch panel, it is possible to avoid inconvenience of blocking the image capturing range of the camera with the right hand performing the operation.

Furthermore, although the tablet personal computer 100 and the tablet personal computer 100' respectively shown in FIG. 1 and FIG. 5 have a shape in which a protruding part is formed on a lateral side of the main surface 1a of the housing 1 in both cases, the shape of the main surface 1a is not limited to the illustrated shape.

Next, a different configuration of the tablet personal computer will be described.

Figure 6:
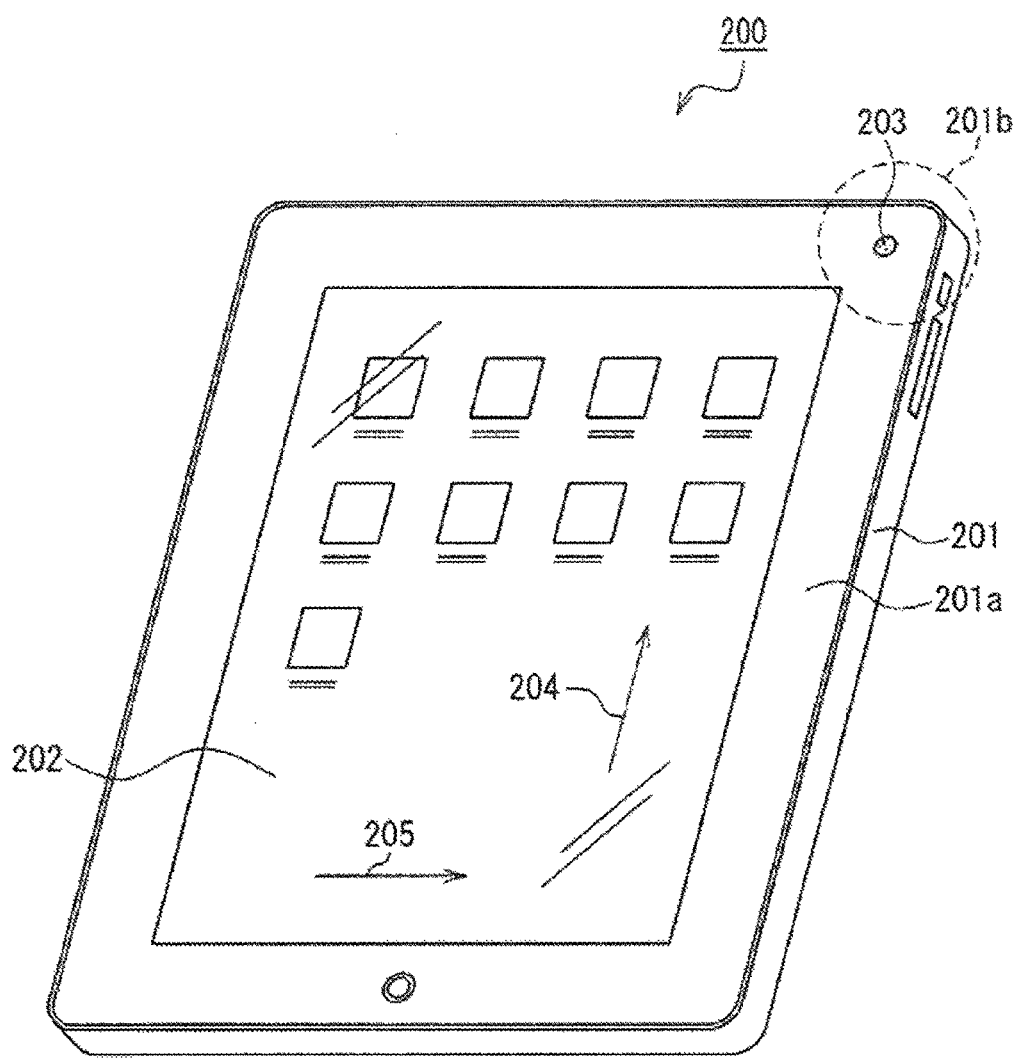
FIG. 6 shows a first configuration example, which is different from that described above, of the tablet personal computer according to the present embodiment.

FIG. 6 is a perspective view showing a first configuration example, which is different from that described above, of the tablet personal computer.

As shown in FIG. 6, a tablet personal computer 200 does not have concavities and convexities such as the handle 3 and the housing 1 as in the case with the tablet personal computer 100 shown in FIG. 1, but has an extremely simply plate-like shaped housing 201. A rectangular image display surface 202 having disposed thereon an image display device such as a liquid crystal panel is formed on a main surface 201a of the housing 201.

In the tablet personal computer 200 shown in FIG. 6, in addition to the image display surface 202, the main surface 201a of the housing 201 also has an approximately rectangular shape that is oriented in a portrait manner. In addition, the width of the frame area surrounding the image display surface 202 is almost equal along the whole circumference of the image display surface 202. In the state shown in FIG. 6, a portrait-oriented image whose vertical direction is the direction indicated by an arrow 204 in the figure is displayed on the image display surface 202 of the tablet personal computer 200.

Also in the tablet personal computer 200 shown in FIG. 6, a camera 203 is disposed in the area surrounding the image display surface 202, at a corner 201b located on a line extending from a diagonal line of the image display surface 202.

When the image display surface 202 is to be used in a landscape-oriented rectangular shape, it is possible to arrange the camera 203 above a displayed image regardless of the direction of the image displayed on the image display surface 202 by displaying the image such that a direction indicated by an arrow 205 in FIG. 6 is the vertical direction, and suppress blocking of the image capturing range of the camera 203 by, for example, a hand or a finger of the user. It should be noted that, when the image display surface 202 is to be used in the landscape-oriented rectangular shape, it is possible to use image control methods such as appropriately rotating a displayed image in accordance with the direction in which the user views.

Also with the tablet personal computer 200 shown in FIG. 6, a more natural image can be captured by tilting the optical axis of the camera 203 toward a reference point located on the perpendicular line from the center of the image display surface 202.

Figure 7:
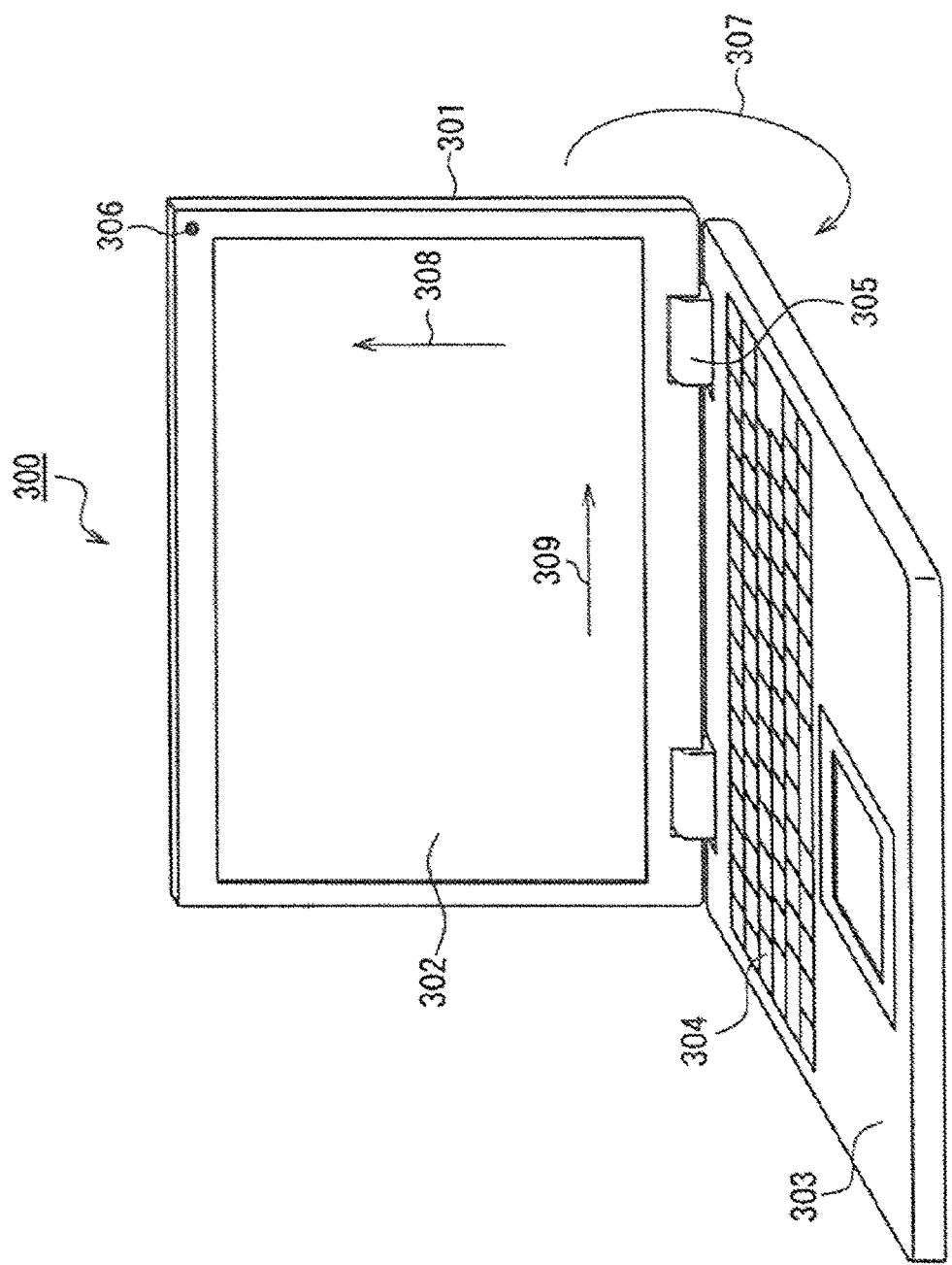
FIG. 7 shows a different second configuration example, which is different from that described above, of a personal computer according to the present embodiment.

FIG. 7 is a perspective view showing a second configuration example, which is different from that described above, of the personal computer. As shown in FIG. 7, although a personal computer 300 has the configuration as an ordinary notebook personal computer, it has a configuration that can be also used as a tablet personal computer.

As shown in FIG. 7, similar to the notebook personal computer, a main body portion 303 including a keyboard 304 or the like on a surface thereof, and a display section 301 having formed thereon an image display surface 302 are attached on the personal computer 300 in an openable/closable manner by a hinge 305.

In a state where the display section 301 is opened as shown in FIG. 7, the personal computer 300 shown in FIG. 7 can be used similarly to the notebook personal computer. In addition, the display section 301 can be rotated until it is located on the back side of the main body portion 303 by the hinge section 305 as shown by an arrow 307 in the figure. When the display section 301 is rotated until its back side and the back side of the main body portion 303 are disposed back to back, a general tablet form can be obtained where the keyboard 304 and the image display surface 302 are each arranged on one of two outside surfaces of the flat box shaped housing. In addition, it is also possible to have the tablet personal computer shaped such that the display section 301 and the main body portion 303 are located on the same plane (i.e., the opening inner angle of the hinge section 305 is 180 degrees).

With the personal computer 300 shown in FIG. 7, by disposing a camera 306 which is an imaging sensor on a corner that is at the upper right side in FIG. 6 and is located on a line extending from a diagonal line of the image display surface 302, at a portion surrounding the image display surface 302, it is possible to capture an image of the user's face from obliquely above.

More specifically, as shown in FIG. 7, when the image display surface 302 is to be used in the opened state, an image whose vertical direction is the direction indicated by an arrow 308 in the figure is displayed on the image display surface 302. Furthermore, when the display section 301 is rotated to the back side of the main body portion 303 to form a tablet-shaped personal computer (i.e., the opening inner angle of the hinge section 305 is in the state shown with the arrow 307), if the image display surface 302 is to be used in a landscape orientation, similar to that shown in FIG. 7, an image whose vertical direction is the direction indicated by the arrow 308 in FIG. 7 is displayed. On the other hand, if the image display surface 302 is to be used in a portrait orientation, an image whose vertical direction is the direction indicated by an arrow 309 in FIG. 7 is displayed. With this, the arrangement position of the camera 306 can be consistently positioned above the center of the image display surface.

As a result, similar to the tablet personal computer 100 shown in FIG. 1 and the tablet personal computer 200 shown in FIG. 6, the personal computer 300 shown in FIG. 7 can capture an image of the user's face from obliquely above even when the displayed image is switched. In addition, also with the personal computer 300 shown in FIG. 7, by tilting the optical axis of the camera 306 toward a reference point located on a perpendicular line with respect to the center of the image display surface, the user can recognize the captured image as being natural.

Figure 8:
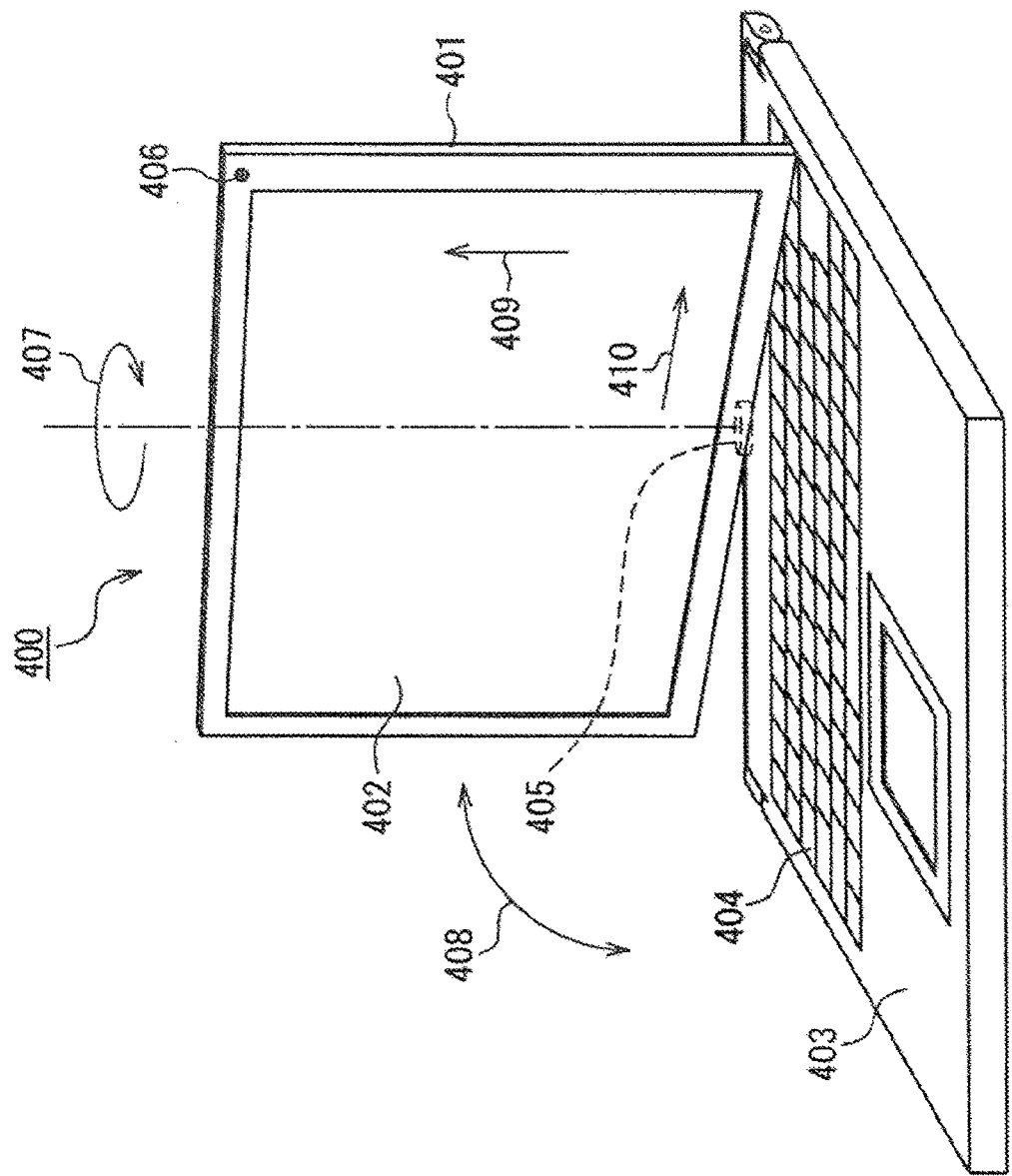
FIG. 8 shows a different third configuration example, which is different from that described above, of the personal computer according to the present embodiment.

FIG. 8 is a perspective view showing a third configuration example, which is different from that described above, of the personal computer. Although a personal computer 400 shown in FIG. 8 also has the configuration as an ordinary notebook personal computer, it also has a configuration that can be used as a tablet personal computer.

As shown in FIG. 8, similar to the personal computer 300 shown in FIG. 7 and similar to an ordinary notebook personal computer, a main body portion 403 including a keyboard 404 or the like on a surface thereof, and a display section 401 having formed thereon an image display surface 402 are attached to the personal computer 400 in an openable/closable manner by a hinge 405. The difference of the personal computer 400 shown in FIG. 8 from the personal computer 300 shown in FIG. 7 is that the display section 401 and the main body portion 403 are connected with the biaxial hinge 405 capable of opening/closing and rotating with respect to two axes that perpendicularly intersect with each other.

In the personal computer 400 having the biaxial hinge 405 as described above, the display section 401 can rotate within the horizontal plane as shown with an arrow 407 using the biaxial hinge 405 as the center, and the display section 401 can be opened/closed with respect to the main body portion 403 as shown with an arrow 408. As a result, a tablet personal computer having a flat box shaped housing with the image display surface 402 disposed on the surface thereof can be obtained, by closing the display section 401 so as to overlap with the main body portion 403, and positioning the image display surface 402 on the outer side but the surface of the main body portion 403 on which the keyboard 404 is disposed on the inner side.

With the personal computer 400 shown in FIG. 8, by disposing a camera 406, which is an imaging sensor, on a corner that is at the upper right side in FIG. 8 and that is located on a line extending from a diagonal line of the image display surface 402 at a portion surrounding the image display surface 402, it is possible to capture an image of the user's face from obliquely above.

More specifically, as shown in FIG. 8, when the image display surface 402 is to be used in the opened state but facing inward, an image whose vertical direction is the direction indicated by an arrow 409 in the figure is displayed. Furthermore, when the image display surface 402 is caused to face outward, and is closed to overlap the main body portion 403 to form a tablet personal computer, if the image display surface 402 is to be used in a landscape orientation, similar to that shown in FIG. 8, an image whose vertical direction is the direction indicated by the arrow 409 in FIG. 8 is displayed. On the other hand, if the image display surface 402 is to be used in a portrait orientation, an image whose vertical direction is the direction indicated by an arrow 410 in FIG. 8 is displayed. With this, the arrangement position of the camera 406 can be consistently positioned above the center of the image display surface 402.

As a result, similar to the tablet personal computers of other configuration examples, the personal computer 400 shown in FIG. 8 can capture an image of the user's face from obliquely above even when the orientation of the displayed image is switched. In addition, by tilting the optical axis of the camera 406 toward a reference point located on a perpendicular line with respect to the center of the image display surface, it is possible to capture an image that is recognized as natural by the user.

It should be noted that the mode of the tablet personal computer can take various configurations other than those illustrated in FIG. 1, FIG. 5, FIG. 6, and FIG. 8. The present disclosure can be apply to a tablet personal computer having an image display surface on which two images whose vertical directions are different from each other by 90 degrees are to be displayed.

Furthermore, although a single camera facing the user has been described in all the embodiments described above, it is possible to use a configuration having two cameras on the right and left facing the user from above, who is viewing the image display surface. Also in this case, the central axes of the cameras disposed on the right and left are left are tilted toward a central axis direction that perpendicularly intersects the image display surface. By having two cameras disposed at two locations on the right and left, it is possible to, for example, capture a stereoscopic image. In addition, when three cameras are each disposed at one of three corners, a stereoscopic image can be captured no matter which one of two images whose vertical directions are different from each other by 90 degrees is displayed on the image display surface.

Furthermore, with two cameras, if a proper image cannot be captured due to the user being located close to one of the cameras, it is possible to use a mode in which the camera located close to the user is turned off.

In the case of the personal computer 400 having a biaxial hinge shown in FIG. 8, by disposing a second camera at, for example, a position shifted parallelly to the central axis of rotation of the biaxial hinge 405 shown with the arrow 407; the user can, by turning on the second camera, use the personal computer 400 without switching the direction thereof when using the personal computer 400 in a tablet form configuration where the image display surface 402 is oriented in a landscape manner and is facing outward.

In the description above, various forms of tablet personal computers are illustrated as an electronic device according to the present embodiment. However, the electronic device of the present disclosure is not limited to a tablet personal computer, can be applied to various electronic devices having an image displaying function and an image capturing function, such as, for example, mobile phones and portable game machines.

As presented above, embodiments has been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. An electronic device comprising:
    a flat box shaped housing having, on a main surface thereof, a rectangular image display surface on which two images whose vertical directions are different from each other by 90 degrees are to be displayed;
    an imaging sensor disposed at a portion surrounding the image display surface; and
    a handle formed in a direction parallel to one side of the image display surface so as to protrude from the housing, wherein
    an optical axis of the imaging sensor is tilted toward a reference point located on a perpendicular line that perpendicularly intersects the image display surface at the center of the image display surface, and
    the imaging sensor is disposed at a portion connecting the housing and both ends of the handle.

2. The electronic device according to claim 1, wherein the imaging sensor is disposed at a portion surrounding the image display surface at a position away from the center of the image display surface in the vertical direction and the horizontal direction.

3. The electronic device according to claim 1, wherein the imaging sensor is disposed at a portion surrounding the image display surface, at a part away from a corner of the image display surface in a diagonal direction.

4. The electronic device according to claim 1, further comprising an operation section disposed at a portion surrounding the image display surface and located along sides other than two sides of the image display surface adjacent to the corner where the imaging sensor is disposed.

5. The electronic device according to claim 1, wherein the reference point is located within an area allowing a viewer holding and viewing the image display surface to clearly view the image display surface.

* * * * *